(12) United States Patent
Paré

(10) Patent No.: US 6,926,466 B2
(45) Date of Patent: Aug. 9, 2005

(54) DEVICE AND A METHOD FOR REHABILITATING CONDUITS

(75) Inventor: Pierre Paré, Ste-Foy (CA)

(73) Assignee: Novaliner Technologies Inc., Ste-Foy (CA)

( * ) Notice: Subject to any disclaimer, the term of this patent is extended or adjusted under 35 U.S.C. 154(b) by 9 days.

(21) Appl. No.: 10/740,482

(22) Filed: Dec. 22, 2003

(65) Prior Publication Data

US 2004/0175239 A1 Sep. 9, 2004

Related U.S. Application Data

(63) Continuation of application No. PCT/CA02/01229, filed on Aug. 7, 2002.
(60) Provisional application No. 60/310,235, filed on Aug. 7, 2001.

(51) Int. Cl.$^7$ .............................. B05B 13/06; B05B 7/12; B05B 15/08; E21D 11/00; F16L 55/18
(52) U.S. Cl. .......................... 405/184.2; 405/150.2; 138/97; 118/317; 118/323; 427/236; 239/407; 239/583; 239/750
(58) Field of Search .......................... 405/150.1, 150.2, 405/184.2; 138/97, 98; 118/317, 323; 427/230, 236; 239/407, 491, 583, 750, 752, 753

(56) References Cited

U.S. PATENT DOCUMENTS

| | | | | |
|---|---|---|---|---|
| 3,601,291 A | * | 8/1971 | Tessmer | 222/519 |
| 4,043,137 A | * | 8/1977 | Jutte et al. | 405/146 |
| 4,178,875 A | | 12/1979 | Moschetti | 118/172 |
| 4,955,755 A | * | 9/1990 | Frey | 405/155 |
| 5,049,003 A | * | 9/1991 | Barton | 405/184.1 |
| 5,429,308 A | * | 7/1995 | Brown | 239/414 |
| 5,462,204 A | * | 10/1995 | Finn | 222/137 |
| 5,674,030 A | * | 10/1997 | Sigel | 405/184.2 |
| 6,439,479 B1 | * | 8/2002 | Jonsson | 239/310 |
| 6,514,346 B1 | * | 2/2003 | Nichols | 118/712 |
| 6,632,475 B1 | * | 10/2003 | Bleggi | 427/236 |

FOREIGN PATENT DOCUMENTS

| | | |
|---|---|---|
| DE | 31 41 273 A1 | 5/1983 |
| JP | 01 168370 A | 7/1989 |
| SU | 535 164 A | 11/1976 |
| SU | 1 136 861 A | 1/1985 |
| SU | 1 734 890 A1 | 5/1992 |

\* cited by examiner

*Primary Examiner*—Thomas B. Will
*Assistant Examiner*—Tara L. Mayo
(74) *Attorney, Agent, or Firm*—Ogilvy Renault

(57) ABSTRACT

A polyurethane applicator (10) for spraying at high-pressures a liner on the inner circumferential wall of an existing conduit (C) to be rehabilitated. The applicator (10) includes a carriage (12) coaxially guided in the conduit (C) and an atomizer (16) rotatably mounted to the carriage (12) for rotation about the central axis thereof. The atomizer (16) is provided with a nozzle (62) through which the lining mixture is forced out while the atomizer (16) rotates and travels in conduit with the carriage (12).

28 Claims, 6 Drawing Sheets

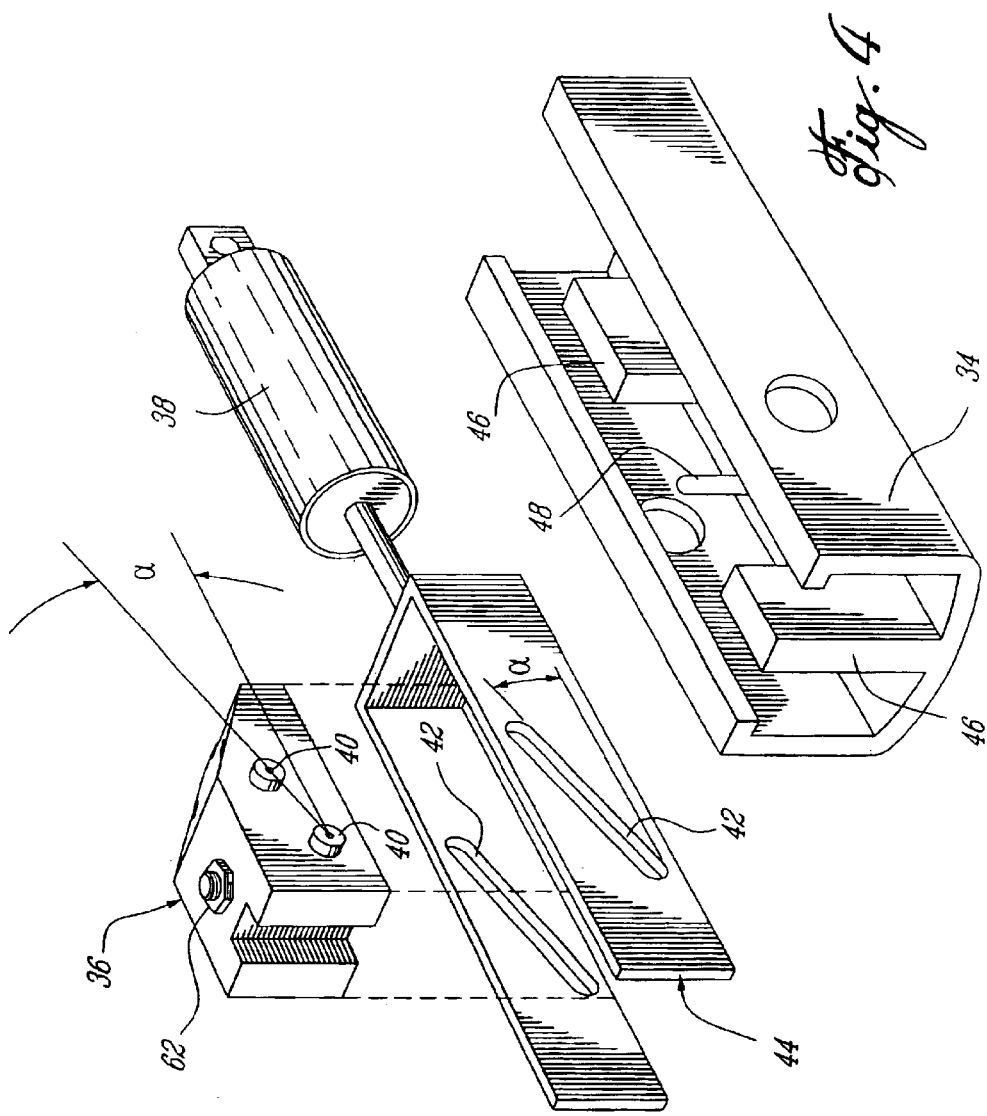

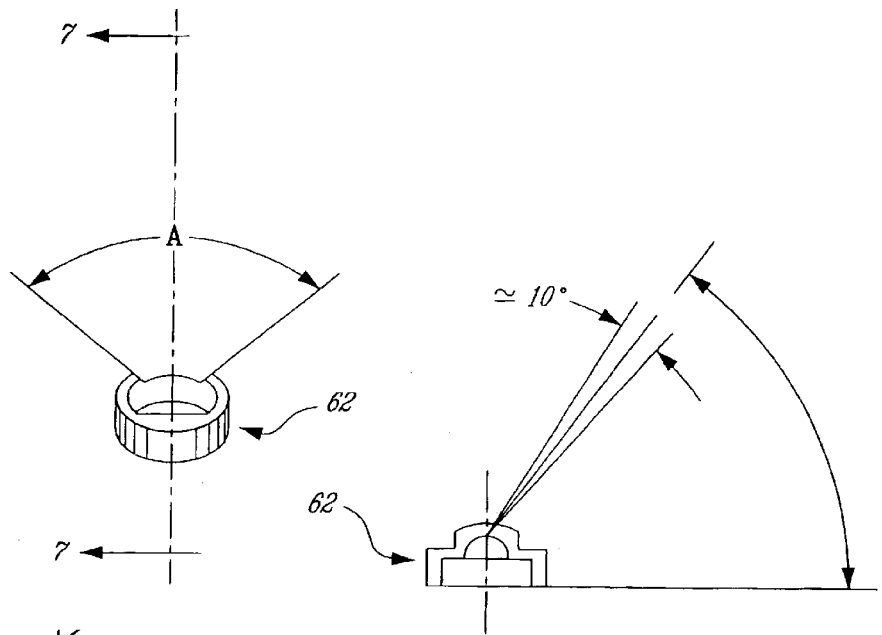
Fig. 6
Fig. 7
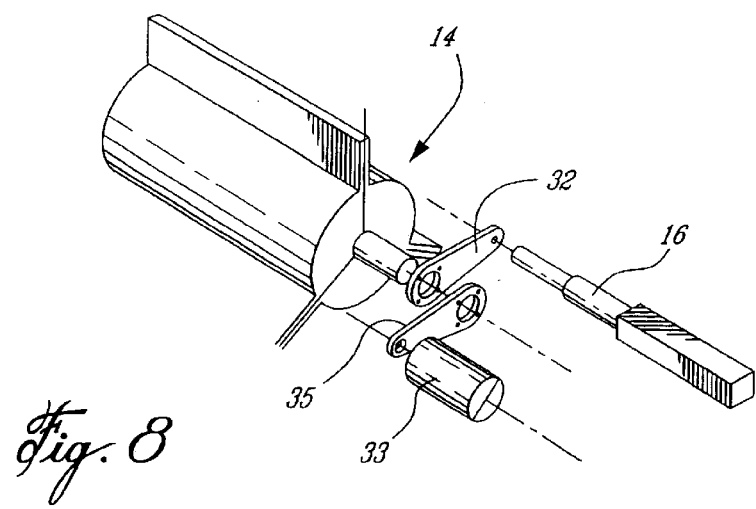
Fig. 8

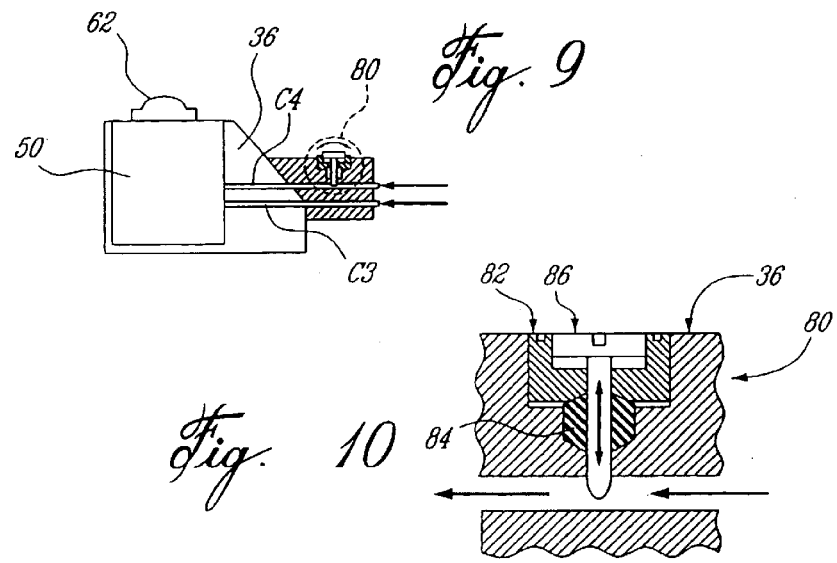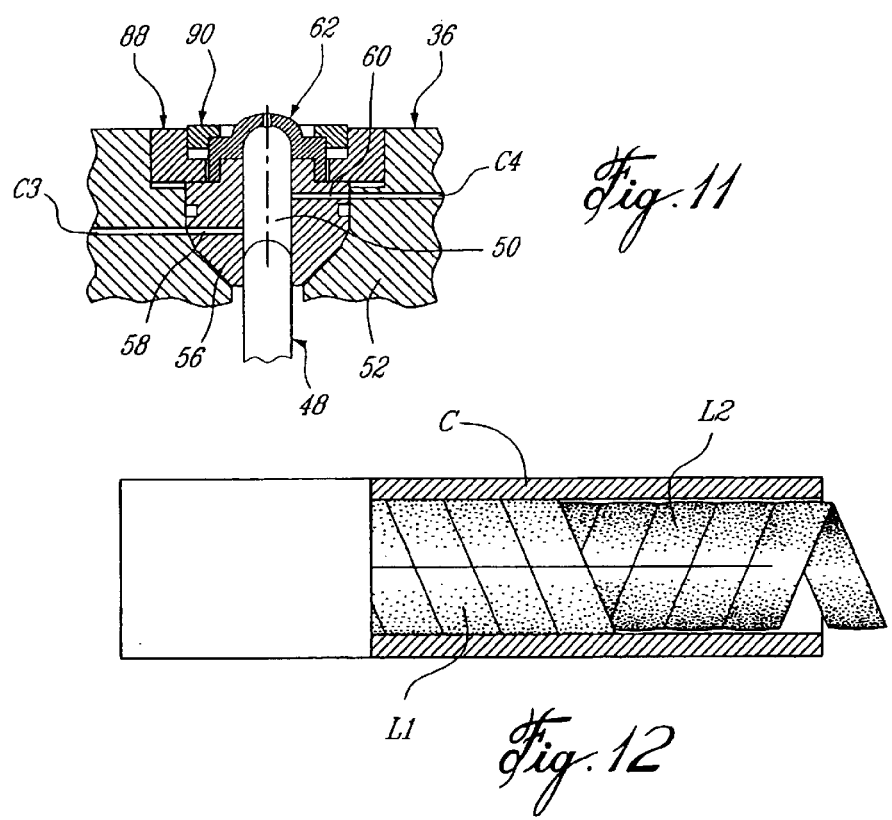

DEVICE AND A METHOD FOR REHABILITATING CONDUITS

RELATED APPLICATIONS

This application is a Continuation of International PCT Application No. PCT/CA02/01229 filed on Aug. 7, 2002, which claims the benefit of U.S. Application No. 60/310,235 filed on Aug. 7, 2001.

BACKGROUND OF THE INVENTION

1. Field of the Invention

The present invention relates generally to maintenance and repair of conduits, such as underground pipelines and ducts and, more particularly, to a device and a method for lining or relining such conduits.

2. Description of the Prior Art

It is common to use conduits buried in the ground for sewage, drainage systems, and the like. Although these underground systems are quite satisfactory for their purposes, it has been found that over a certain period of time, these conduit systems can deteriorate and become damaged.

Conventional methods of repairing underground conduits generally consist in applying a pre-mixed lining mixture on the inner wall of the damaged conduit by supplying at low pressure the pre-mixed lining mixture on a revolving disc so as to cause the lining mixture to be centrifuged against the inner wall of the conduit. The pre-mixed lining mixtures are typically made of mortar or epoxy. Such lining mixtures require relatively long drying period.

Although it is known to spray quick setting lining mixtures, such as polyurethane, on a surface to be rehabilitated, the use of such lining mixtures in conduits have been so far greatly limited due to the minimum distance required between the spray source and the surface to be rehabilitated and also because of the difficulty of uniformly applying the sprayed mixture to the inner circumferential walls of the conduits. Known polyurethane sprayers are typically in the form of spray guns manually operated and requiring a distance of about 24 inches between the spray source and the surface to be rehabilitated. The height of such spray guns typically varies between 10 to 12 inches. The dimensions of the guns and the minimum required application distances render the utilization of such guns quite hazardous and sometimes even impossible in conduits having an internal diameter of about 36 inches or less. Furthermore, the manual operation of the guns does not allow for a uniform application of the spray-applied liner.

There is thus a need for a novel method and a compact apparatus for applying a fast setting lining material to the inner walls of a wide variety of conduits.

SUMMARY OF THE INVENTION

It is therefore an aim of the present invention to provide a novel apparatus for lining damaged conduits.

It is also an aim of the present invention to provide such an apparatus that provides for improved surface finish of the applied liner.

It is a further aim of the present invention to provide such an apparatus adapted to line or reline a wide variety of conduits.

It is a still further aim of the present invention to provide such an apparatus that is of compact construction.

It is still a further aim of the present invention to provide a novel jet sprayer adapted to spray a lining mixture at a short distance from the surface to be rehabilitated.

It is still a further aim of the present invention to provide a novel in-situ lining method for damaged conduits.

It is still a further aim of the present invention to provide such a method that allows for uniform distribution of the lining material on the inner wall of a conduit to be rehabilitated.

Therefore, in accordance with the present invention, there is provided a device for lining a conduit to be rehabilitated, comprising a movable carriage having an axis, said carriage being adapted to enter and be displaced coaxially through the conduit, and a sprayer rotatably mounted to said carriage for rotation about said axis, said sprayer including a nozzle through which a lining mixture is forced out under pressure while said sprayer is rotated about said axis and said carriage is axially displaced along the conduit, thereby providing for a uniform distribution of the lining mixture on an inner wall of the conduit.

In accordance with a further general aspect of the present invention, there is provided a method for in-situ lining of a conduit to be rehabilitated comprising the steps of: inserting a spray source into a conduit to be rehabilitated, and forming a continuous liner on an inner wall of said conduit by spraying a lining material on the inner wall while the spray source is coaxially displaced in the conduit and rotated about a central axis thereof.

In accordance with a further general aspect of the present invention, there is provided an atomizer for spraying a fast setting lining material on a surface, the atomizer comprising an elongated body, a head mounted at one end of said elongated body and defining a mixing chamber for receiving the components of the fast setting lining material, said head carrying a nozzle through which the fast setting lining material is forced out of the mixing chamber, and a linear actuator extending along said elongated body for displacing said head in a direction perpendicular to said elongated body between a closed position, wherein the components of the fast setting lining material are prevented from reaching said mixing chamber, and an open position wherein the components of the fast setting material are free to flow into said mixing chamber.

BRIEF DESCRIPTION OF THE DRAWINGS

Having thus generally described the nature of the invention, reference will now be made to the accompanying drawings, showing by way of illustration a preferred embodiment thereof, and in which:

FIG. 4 is an exploded view of the atomizer;

FIG. 6 is a schematic perspective view of a nozzle forming part of the atomizer;

FIG. 7 is a cross-sectional view taken along line 7—7 in FIG. 6;

FIG. 8 is a schematic perspective view of the applicator rotor illustrating how the revolving atomizer is counterbalanced by a counterweight system;

FIG. 9 is a schematic cross-sectional view of the atomizer head equipped with a pressure loss regulator;

FIG. 10 is a schematic cross-sectional view of the pressure loss regulator shown in FIG. 9;

FIG. 11 is a schematic cross-sectional view of the atomizer head in accordance with a second embodiment of the present invention and;

FIG. 12 is a schematic cross-sectional view of a conduit having an inner circumferential wall against which first and second layers of fast setting lining material have been applied in an inverted helical pattern.

DESCRIPTION OF THE PREFERRED EMBODIMENTS

Figure 1:
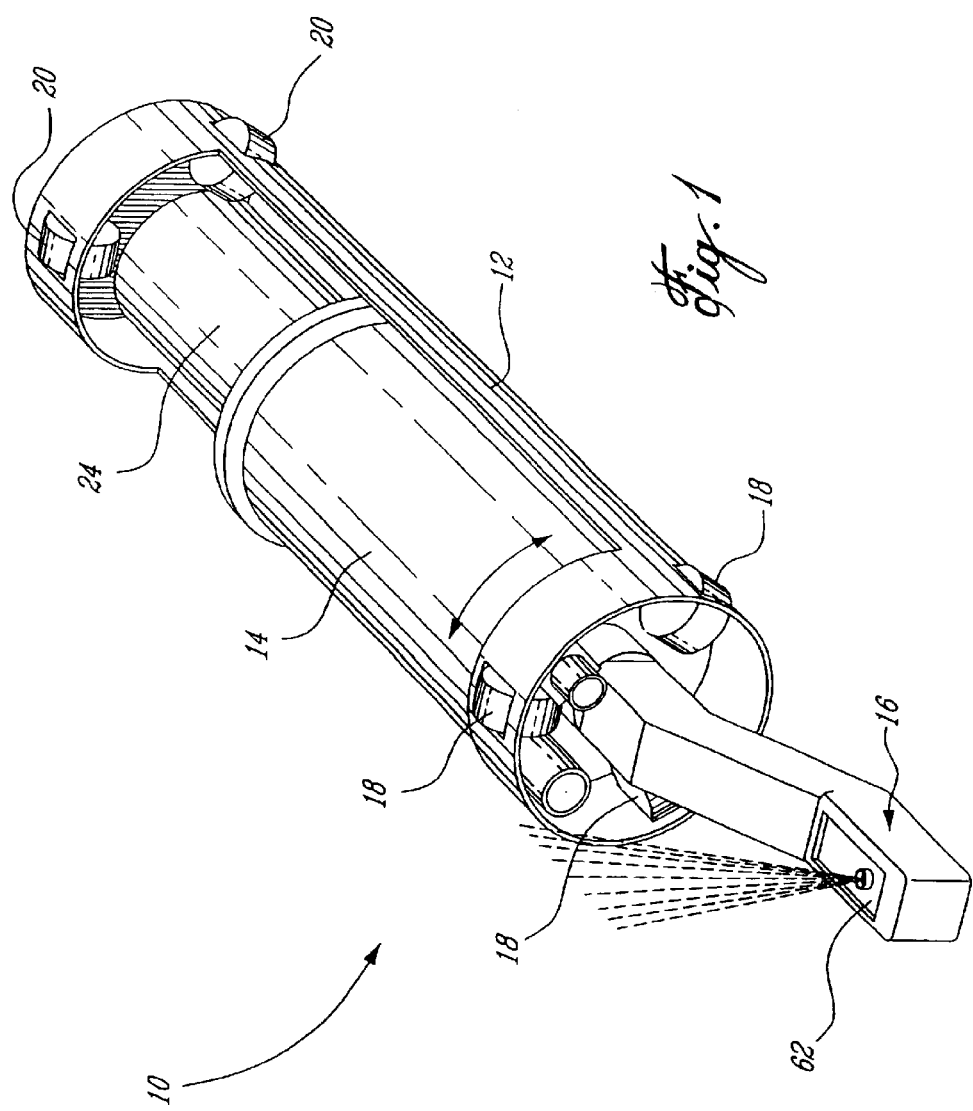
FIG. 1 is schematic perspective view of a liner applicator.

FIG. 1 illustrates a compact liner applicator 10 adapted to be inserted in a corroded or damaged conduit C for spraying a lining material on the inner circumferential wall of the conduit C so as to form a continuous liner on the inner wall of the conduit C. When the liner sets after application on the inner wall of the conduit C, it results in substantially impervious water and chemical resistant built in place tube or barrier ensuring the integrity of the conduit C. The liner applicator 10 is particularly useful for reconditioning small conduits having a diameter of less than 36 inches. For instance, the applicator 10 can be used to line conduits having a diameter as small as 150 mm. However, the liner applicator 10 is not limited to be used in small diameter conduits. It can be used to line or reline a wide variety of conduits, such as sewage lines, drainage lines, manhole, and the like.

The liner applicator 10 is particularly suited for spraying a fast setting plastic material, such as polyurethane. For instance; the lining material may be a mixture of an isocyanate pre-polymer and a polyol resin or an amino polyol to respectively provide polyurethane or a polyurea. The polyurea is particularly well adapted to be used in underground lines in that it is humidity resistant. The applicator 10 could also be used to build in place an epoxy conduit within a damaged conduit. As will be seen hereinafter, the high-pressure sprayed membrane applicator 10 is adapted to efficiently build a variety of plasticized conduits within existing conduits.

Figures 2, 3A, 3B:
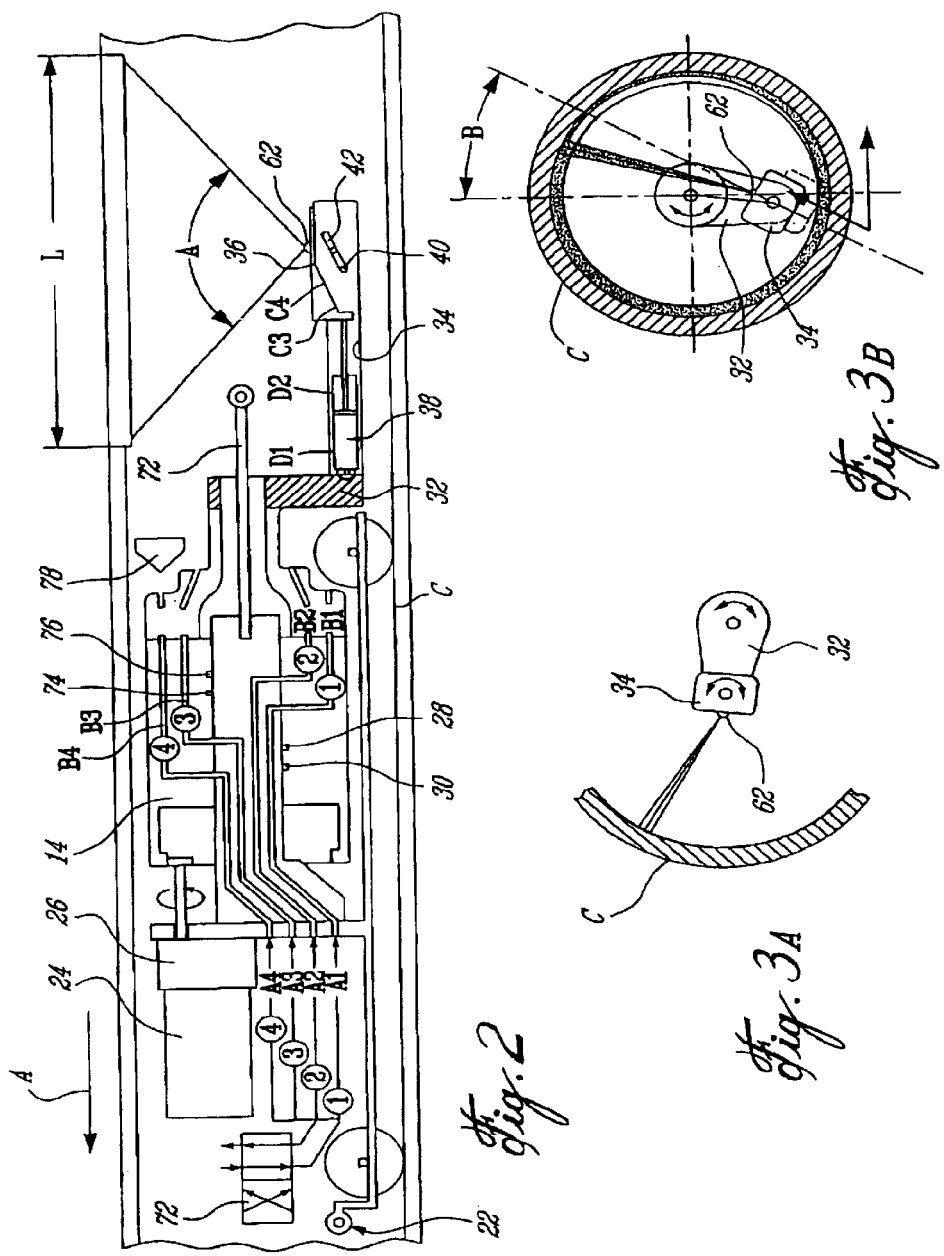
FIG. 2 is a schematic cross-sectional side view of the liner applicator.
FIGS. 3a and 3b are schematic cross-sectional end views illustrating how the atomizer head of the applicator may be adjusted depending on the diameter of the conduit to be rehabilitated.

As shown in FIGS. 1 and 2, the liner applicator 10 generally comprises a cylindrical wheeled carriage 12, a rotor 14 rotatably mounted to the cylindrical carriage 12 for rotation about a central longitudinal axis of the carriage 12 and a spray source, such as an airless atomizer 16 projecting forwardly from the rotor 14 for joint rotation therewith relative to the carriage 12.

First and second sets of circumferentially distributed rollers 18 and 20 are provided at opposed end of the carriage 12 to centrally support the same in the conduit C. Interchangeable sets of rollers of different diameters may be provided for allowing the liner applicator 10 to be used in conduits of different internal diameters. Alternatively, the rollers 18 and 20 may be adjustably mounted to the carriage 12 via an auto-centering system for allowing the longitudinal axis of the applicator 10 to be centered in the conduit C. The applicator 10 must be coaxial to the axis of the conduit to provide for a uniform distribution of the lining mixture on the inner circumferential wall of the conduit C.

The liner applicator 10 is axially displaced along the conduit C at a predetermined speed by means of a fish line (not shown) or a winch (not shown) attached to the carriage 12 such as at 22 (see FIG. 2). Alternatively, the rollers 18 and 20 could be motorized. It is understood that the applicator 10 is operated by remote control.

As best seen in FIG. 2, a motor 24 is mounted at the rear end of the carriage 12 to drive the rotor 14 through a planetary gearbox 26. The rotor 14 and the atomizer 16 are jointly rotated about the longitudinal axis of the applicator 10 at a predetermined speed while the carriage 12 is axially displaced in the conduit C to provide uniform distribution of the relining material (polyurethane or polyurea) on the inner circumferential wall of the conduit C and, thus, allow for the creation of liners of uniform thickness.

As shown in FIG. 2, the components (for instance the isocyanate and the resin) entering in the composition of the lining mixture to be applied are separately fed to the liner applicator 10 via a pair of hoses 3 and 4, which are preferably heated up in order to respectively reduce the viscosity of the isocyanate and the resin. The isocyanate is directed from the hose 3 into a passage A3 defined through a central cylindrical part of the body of the carriage 12. Likewise, the resin is directed from the hose 4 to a passage A4 defined in the central part of the body of the carriage 12. The isocyanate and the resin are then transferred from the passages A3 and A4 to respective annular sealed chambers 28 and 30 defined in the rotor 14 about the central part of the body of the carriage 12. The annular sealed chambers 28 and 30 ensure continuous flow communication between the carriage 12 or stator and the rotor 14 and that irrespectively of the angular position of the rotor 14 relative to the carriage 12.

The annular sealed chambers 28 and 30 respectively communicate with passages B3 and B4 extending forwardly through the rotor 14 for respectively receiving the isocyanate and the resin. Two flexible hoses (not shown) respectively extend from the passages B3 and B4 to inlet port C3 and C4 in the atomizer 16 to respectively transfer the isocyanate and the resin to the atomizer 16 where they are mixed together before being expelled under pressure as a spray.

As shown in FIG. 2, the atomizer 16 comprises a crank axle formed by an axially extending elongated arm 34 removably and pivotally connected at a proximal end thereof to a crank lever or replaceable parametric lever 32 used to connect the arm 34 to the rotor 14 in parallel to a rotating axis thereof. The parametric lever 32 is an interchangeable component of variable length. The length of the parametric lever 32 to be used is determined as a function of the diameter of the conduit to be rehabilitated. As shown in FIG. 8, some levers might necessitate the use of a counterweight 33 to counterbalance the weight of the atomizer 16 at the other end of the lever. The weight 33 could be mounted at the free distal end of an interchangeable lever 35 extending in a direction opposite to that of the parametric lever 32. The lever 35 would be mounted on the rotation axis of the atomizer 16. Levers of various lengths and different counterweights can be used to counterbalance the atomizer 16 and regulate the rotational speed of the assembly.

As seen in FIGS. 3a and 3b, the arm 34 can pivot from 0 degree to 360 degrees about its longitudinal axis with respect to its point of connection to the lever 32. For small conduits, the arm 34 is preferably pivoted to spray radially inwardly relative to the central axis of the conduit (FIG. 3b), whereas for conduits with larger inner diameters, the arm 34 may be pivoted to spray radially outwardly relative to the central axis (FIG. 3a). By so changing the orientation of the spraying source, a same spraying source can be used in conduits of different internal diameters.

As seen in FIGS. 2 and 4, the atomizer 16 further includes a head 36 and an actuator, such as a pneumatic cylinder 38, for operating the head 36 in order to close and open the atomizer 16. The head 36 is provided on either side thereof with a pair of roller bearings 40 having their center located on an inclined line defining an angle α. The roller bearings 40 are received in inclined slots 42 defined in a drawer 44 slidably mounted for reciprocating movement along the arm 34 by operation of the cylinder 38. The inclination of the slots 42 corresponds to that of the roller bearings 40. The head 36 is engaged at opposed ends thereof for longitudinal movement along a pair of guides 46 projecting at right angles from a bottom wall of the arm 34. Therefore, the reciprocating movement of the drawer 44 along the arm 34 will cause the head 36 to be reciprocated along the guides 46 in a direction perpendicular to the movement of the drawer 44 in order to close or open the atomizer 16, as will be explained hereinafter.

Figure 5:
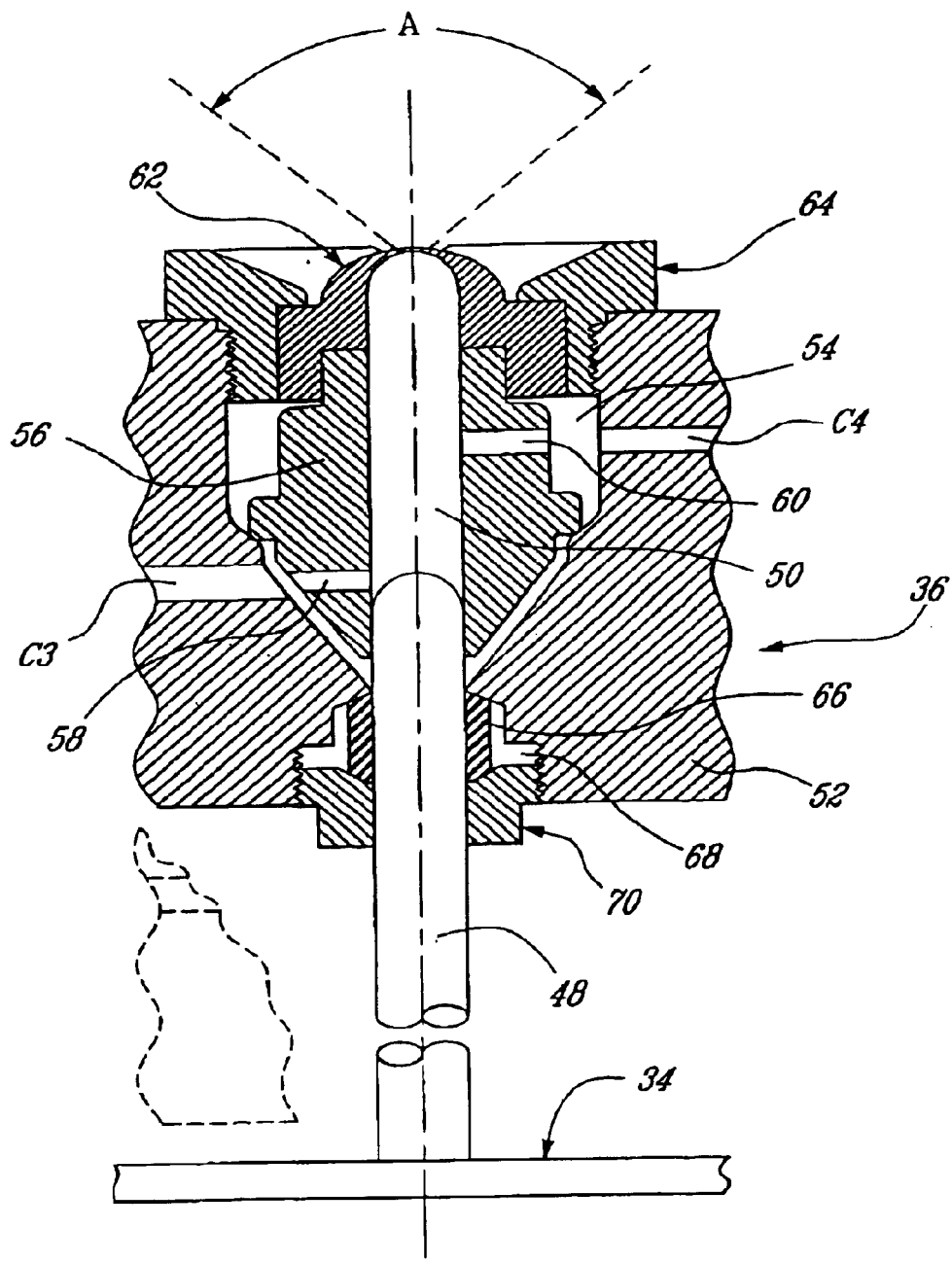
FIG. 5 is a schematic cross-sectional elevation view of the head of the atomizer.

As seen in FIG. 5, the head 36 includes a main body 52 defining a cavity 54 for receiving an insert 56 defining a mixing chamber 50. The isocyanate and the resin are respectively admitted into the mixing chamber 50 via passages 58 and 60 communicating with inlet ports C3 and C4 in the main body 52 of the head 36. A nozzle 62 is seated on top of the insert for metering and directing the mixture of isocyanate and the resin against the inner wall of the conduit C as a jet spray. The nozzle 62 is maintained in place by means of a nut 64 threadably engaged with the main body 52 of the head 36. A needle valve or state selection pin 48 extends at right angles from the bottom wall of the arm 34 between the guides 46 into the mixing chamber 50. As illustrated in broken lines in FIG. 5, when the head 36 is lowered onto the pin 48 by operation of the cylinder 38, the passages 58 and 60 are closed, thereby preventing the isocyanate and the resin from reaching the mixing chamber 50. However, when the cylinder 38 is operated so as to cause the head 36 to move towards a distal end of the pin 48 to an open position as illustrated in full lines in FIG. 5, the pin clears respective outlets of the passages 58 and 60, thereby allowing the isocyanate and the resin to reach the mixing chamber 50. By mounting the cylinder 38 on the elongated arm 34 for axial movement therealong and by transferring the movement of the cylinder 38 to the head 36 in a direction perpendicular to the longitudinal axis of the arm 34, the length of the pin 48 and of the mixing chamber 50 can advantageously be reduced as compared to conventional atomizers having axially arranged actuators and state selection pins.

The pin 48 extends through a packing seal 66 provided in a packing chamber 68 defined at the lower end of the main body 52 of the head 36. A nut 70 is threadably engaged with the main body 52 to maintain the seal 66 in position within the packing chamber 68.

As shown in FIG. 2, a solenoid valve 72 is provided at one end of the carriage 12 for controlling the operation of the pneumatic cylinder 38. The valve is connected on one side to a flexible air inlet hose (not shown) and a flexible air outlet hose (not shown), and on the other side to fist and second air passages A1 and A2 defined in the central body of the carriage 12. The air passages A1 and A2 are respectively in continuous flow communication with passages B1 and B2 defined in the rotor 14 via annular sealed chambers 74 and 76. Flexible hoses (not shown) are used to connect the passages B1 and B2 with ports D1 and D2 of the cylinder 38.

As schematically illustrated at 78 in FIG. 2, various tools, such as a camera, a light and a microphone can be mounted to the front end of the carriage 18.

Now referring to FIGS. 2, 3b and 5 to 7, it can be seen that the nozzle 62 allows spraying the lining mixture (polyurethane or polyurea) over a length L of 200 mm in a conduit having an inner diameter of 150 mm. As shown in FIGS. 3a and 3b, the nozzle 62 is orientable to control the impact angle of the lining mixture on the inner wall of the conduit C. A variety of nozzles are interchangeably used to provide for longitudinal diffusion angles A varying from 15 degrees to 120 degrees and radial diffusion angles B varying from 1 degree to 50 degrees. The nozzles are selected in accordance with the internal diameter of the conduits to be reconditioned. As seen in FIGS. 6 and 7, the nozzle 62 is slotted at predetermined angles relative to the central axis of the mixing chamber 50 to provide a longitudinal diffusion angle A and a radial diffusion angle B suitable to obtain a desired surface finish for a given internal diameter of conduit. By controlling the angle of diffusion, it becomes possible to apply thinner layers of lining material on the inner walls of the conduits and, thus, improved the quality of the surface finish. The inclination and the flaring configuration of the spray orifice (slot) of the nozzle 62 advantageously contribute to significantly increase the diffusion angle of the lining mixture as compared to conventional nozzles.

In operation, the conduit C to be rehabilitated is first located and exposed, such as by excavation in the case of underground conduits not accessible via a manhole, for allowing on site rehabilitation. A hole is defined in the conduit C for allowing the applicator 10 to be inserted therein. The rotational speed of the atomizer 16, the advancing speed of the carriage 12, the impact angle of the lining mixture on the inner wall of the conduit C, the diffusion angle of the mixture and the distance between the nozzle 62 are all operating parameters that are adjusted or predetermined. After having set all the operating parameters in accordance with the specific conduit to be repaired, the components entering in the composition of the lining mixture are separately supplied under pressure and at a constant flow rate into the mixing chamber 50 before being sprayed while the liner applicator 10 is displaced coaxially within the conduit C in the direction indicated by arrow A in FIG. 2 with the atomizer 16 rotating at a predetermined rotational speed to effect uniform distribution of the lining mixture on the inner circumferential wall of the conduit C as the applicator 10 travels therein. The components of the lining mixture are mixed together at a high pressure and sprayed against the inner wall of the conduit at a pressure of about 2500 psi.

Once mixed together, the isocyanate and the polyol resin or the amino polyol immediately react, thereby providing for a fast setting of the lining mixture. This allows successive layers to be applied to obtain the desired thickness with a minimum waiting period between each application. However, with that type of lining mixture, the components have to be mixed together at the spraying source as the lining mixture is being applied.

As illustrated in FIG. 12 each layer of lining material is built in place by spraying a continuous helical band of material with each spire of material slightly (about 10 percent) overlapping the preceding one. The alternation of the direction of rotation of the atomizer 16 allows creating a lining sequence of two or more layers L1 and L2 having opposite helical developments. This principle contributes to the uniformity and the imperviousness of the final membrane.

The advancing speed of the carriage 12 and the rotational speed of the atomizer 16 can be adjusted during use to vary the thickness of the applied membrane along the conduit C.

The lining material can also be sprayed onto the inner wall of the conduit C without driving the atomizer in rotation.

This enable to project the lining material at any selected circumferential location of the conduit C. To ensure the complete coverage of all the inner surface of the conduit, the atomizer 16 could be provided with a multi-nozzle tip system. For instance, three nozzles 62 could be provided to ensure 360 degrees diffusion of the lining material.

The configuration of the atomizer 16 advantageously allows applying the lining or coating material at a short distance from the surface to be coated. The crankshaft shape of the atomizer 16 advantageously provides the required clearance to mount the rollers 18 and the tools 78 at the front of the carriage 12. This also allows recessing the rollers 18 in the carriage 12 to have access to small diameter conduits.

It is also noted that the atomizer 16 may be used as a hand tool to coat difficult to reach places. Indeed, the arm 34, the head 36, the actuator 38 and the drawer 44 defining the inclined slots 42 in which the roller bearings 40 are constrained to move, form a spray arm that could be used as a spray gun.

As shown in FIGS. 9 and 10, a pressure loss regulator 80 is preferably used to ensure that the isocyanate and the polyol resin or the amino polyol be supplied at substantially the same pressure into the mixing chamber 50. The paths followed by the components (i.e. the isocyanate and the polyol resin or the amino polyol) of the lining mixture are different and, thus, the pressure losses in each circuit are different. To obtain an adequate mixture of the two components and, thereby, enhance the quality of the final product, it is preferable that the pressure differential between the circuits be as small as possible. To balance the pressure, it is contemplated to place one regulator 80 in one of the component circuits near the mixing chamber 50 (see FIG. 9). The regulator 80 provides added flexibility to the process by allowing adapting the system to the viscosity of the multiples available lining products, to correct the variation of pressure loss without changing the mixing chamber 50 while the products are directed therein, to balance the pressure rapididly during a change of mixing chamber or in operation. The principle of the regulator 80 is to act on the diameter of the circuit of one of the components of the lining mixture. The reduction or the increase of that diameter will allow changing the fluid pressure in the selected circuit. The small length of the portion of the selected circuit comprised between the regulator 80 and the mixing chamber 50 is such that the pressure losses in that portion can be viewed as negligible.

As shown in FIG. 10, the regulator 80 comprises a first nut 82 threadably engaged with the nozzle head 36 to press on a seal 84. The pressure on the seal 84 is adjusted to prevent fluid leakage while not interfering with the vertical movement of a needle valve 86. The needle valve 86 has a head adapted to be threadably engaged with the first nut 82. The head carries a stem which is adapted to project into the flow path of one of the components of the lining mixture. By vertically displacing the needle valve 86, the diameter of the passage of the selected component can, thus, be varied as desired.

In order to facilitate the re-orientation of the nozzle 62 or the replacement thereof by another similar nozzle, it is contemplated to use a fixation system with two nuts instead of one as illustrated in the embodiment of FIG. 5. FIG. 11 shows a second embodiment of the present invention wherein the insert 56 is maintained in place by a first nut 88 threadably engaged with the body 52 of the head 36. A second nut 90 is threadably engaged with the first nut 88 to maintain the nozzle 62 in position on the insert 56. To remove the nozzle 62, the operator has merely to unscrew the second nut 90 from the first nut 88. In this way the position of the insert 56 is never affected by the replacement of the nozzle 62.

What is claimed is:

1. A device for lining a conduit to be rehabilitated, comprising a movable carriage having an axis, said carriage being adapted to enter and be displaced coaxially through the conduit, and a spray source rotatably mounted to said carriage for rotation about said axis, said spray source including a nozzle through which a fast setting lining mixture is forced out under pressure while said spray source is rotated about said axis and said carriage is axially displaced along the conduit, thereby providing for a uniform distribution of the lining mixture on an inner wall of the conduit, wherein at least first and second fluid passages arc provided for separately feeding first and second components of the fast setting lining mixture to the spray source where the first and second components are mixed together as the lining mixture is being applied, and wherein said spray source comprises a head carrying said nozzle, said head defining a mixing chamber far separately receiving the first and second components of the fast setting lining mixture, said mixing chamber having at least first and second inlet ports respectively connected in fluid flow communication with said first and second fluid passages, said nozzle being in fluid flow communication with said mixing chamber for receiving the lining mixture therefrom, and wherein said head is fitted on a pin for relative movement therealong between a first position in which the head is lowered onto said pin with the pin substantially filling the mixing chamber, thereby simultaneously blocking said first and second inlets, and a second position in which said pin is substantially withdrawn from said mixing chamber, thereby clearing said first and second inlets.

2. A device as defined in claim 1, wherein said spray source includes a rotatable crank axle, said nozzle being mounted at a distal end of said crank axle for rotation about said axis.

3. A device as defined in claim 2, wherein said nozzle is orientable to selectively spray radially inwardly and radially outwardly relative to said axis.

4. A device as defined in claim 2, wherein said rotatable crank axle includes a crank lever extending at right angles from said axis and a revolving arm extending from said crank lever in parallel to said axis.

5. A device as defined in claim 4, wherein said crank lever is an interchangeable component of variable length.

6. A device as defined in claim 4, wherein said revolving arm carries said nozzle, and wherein said revolving arm is pivotable about a longitudinal axis thereof relative to said crank lever for setting the orientation of said nozzle.

7. A device as defined in claim 4, wherein said head is displaceable by an actuator to selectively close or open said spray source, said actuator being arranged at right angles relative to a spraying direction of the device to provide for a compact sprayer configuration.

8. A device as defined in claim 7, wherein said actuator is mounted to said revolving arm for reciprocating a drawer along said revolving arm, and wherein said drawer is connected to said head to transfer the movement imparted thereto by said actuator to said head in a direction perpendicular to said revolving arm.

9. A device as defined in claim 8, wherein said drawer extends on each side of said head, said drawer defining a pair of inclined slots in which roller bearings extending laterally outwardly of said head are constrained to move.

10. A device as defined in claim 8, wherein said head has a body defining a cavity for receiving an insert into which said mixing chamber is formed, said nozzle being seated on top of said insert and in fluid flow communication with said mixing chamber for receiving the lining mixture therefrom, and wherein a first nut is threadably engaged with said body for maintaining said insert in place, said nozzle being received in a recess defined in said first nut, and wherein a second nut is threadably engaged in said recess for maintaining said nozzle in place independently of said insert.

11. A device as defined in claim 7, wherein said actuator is a pneumatic cylinder extending along said revolving arm.

12. A device as defined in claim 4, wherein a counterweight is provided at a free distal end of a lever mounted at right angles to the axis in a direction opposite to said crank lever.

13. A device as defined in claim 1, wherein said nozzle defines an inclined and outwardly flaring slotted spray orifice.

14. A device as defined in claim 1, wherein said spray source includes an arm extending in parallel to said axis and mounted for rotation thereabout, said arm being offset from said axis, said head being displaceable by an actuator for selectively closing and opening said spray source, wherein said actuator extends along said arm, and wherein said head is displaceable in a direction perpendicular to said arm end said actuator.

15. A device as defined in claim 1, wherein said carriage is equipped with a set of rollers for centering said carriage in the conduit to be rehabilitated.

16. An atomizer for spraying a fast setting lining material on a surface, the atomizer comprising an elongated body having a first axis, a head mounted at one end of said elongated body and defining a mixing chamber for separately receiving the components of the fast setting lining material from separate fluid passages, said mixing chamber having a second axis angularly oriented relative to said first axis, said head carrying a nozzle through which the fast setting lining material is forced out of the mixing chamber along said second axis, and an actuator oriented along said first axis for displacing said head along said second axis between a closed position, wherein the components of the fast setting lining material are prevented from reaching said mixing chamber, and an open position wherein the components of the fast setting material are free to flow into said mixing chamber.

17. An atomizer as defined in claim 16, wherein the actuator is mounted to said elongated body for reciprocating a drawer therealong, and wherein said drawer is connected to said head to transfer the movement imparted thereto by said actuator to said head in a direction perpendicular to said elongated body.

18. An atomizer as defined in claim 17, wherein said drawer extends on each side of said head, said drawer defining a pair of inclined slots in which roller bearings extending laterally outwardly of said head are constrained to move.

19. An atomizer as defined in claim 16, wherein said head moves up and down a needle valve extending at right angles from said elongated body.

20. A device for lining a conduit to be rehabilitated, comprising a movable carriage, said carriage being adapted to enter and be displaced coaxially through the conduit, and a spray source rotatably mounted to said carriage for rotation about a central rotation axis, said spray source including a nozzle through which a lining mixture is forced out under pressure while said spray source is rotated about said axis and said carriage is axially displaced along the conduit, thereby providing for a uniform distribution of the lining mixture on an inner wall of the conduit, and wherein said spray source includes a rotatable crank axle having a crank lever extending at right angles from said central rotation axis and a revolving arm extending from said crank lever in parallel to said axis, said revolving arm being offset from said central rotation axis, said nozzle being mounted to said revolving arm.

21. A device as defined in claim 20, wherein said crank lever is an interchangeable component of variable length.

22. A device as defined in claim 20, wherein said revolving arm is rotatable about a longitudinal axis thereof.

23. A device as defined in claim 22, wherein said head is displaceable by an actuator to selectively close or open said spray source, said actuator being arranged at right angles relative to a spray direction of the device to provide for a compact sprayer configuration.

24. A device as defined in claim 23, wherein said actuator is mounted to said revolving arm for reciprocating a drawer along said revolving arm, and wherein said drawer is connected to said head to transfer the movement imparted thereto by said actuator to said head in a direction perpendicular to said revolving arm.

25. A device as defined in claim 24, wherein said drawer extends on each side of said head, said drawer defining a pair of inclined slots in which roller bearings extending laterally outwardly of said head are constrained to move.

26. An atomizer for spraying a fast setting lining material on a surface, the atomizer comprising an elongated body, a head mounted at one end of said elongated body and defining a mixing chamber for separately receiving the components of the fast setting lining material from separate fluid passages, said head carrying a nozzle through which the fast setting lining material is forced out of the mixing chamber, and a linear actuator extending along said elongated body for displacing said head in a direction substantially perpendicular to said elongated body between a closed position, wherein the components of the fast setting lining material are prevented from reaching said mixing chamber, and on open position wherein the components of the fast setting material are free to flow into said mixing chamber, wherein the actuator is mounted to said elongated body for reciprocating a drawer therealong, and wherein said drawer is connected to said head to transfer the movement imparted thereto by said actuator to said head in a direction substantially perpendicular to said elongated body.

27. An atomizer as defined in claim 26, wherein said drawer extends on each side of said head, said drawer defining a pair of inclined slots in which roller bearings extending laterally outwardly of said head are constrained to move.

28. An atomizer as defined in claim 26, wherein said head moves up and down a needle valve extending at right angles from said elongated body.

* * * * *